US009178884B2

United States Patent
Khosravi et al.

(10) Patent No.: US 9,178,884 B2
(45) Date of Patent: Nov. 3, 2015

(54) ENABLING ACCESS TO REMOTE ENTITIES IN ACCESS CONTROLLED NETWORKS

(75) Inventors: Hormuzd Khosravi, Portland, OR (US); Venkat R. Gokulrangan, Portland, OR (US); Tal Shustak, Jerusalem (IL); Avigdor Eldar, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 2067 days.

(21) Appl. No.: 11/899,991

(22) Filed: Sep. 7, 2007

(65) Prior Publication Data

US 2009/0070467 A1    Mar. 12, 2009

(51) Int. Cl.
*H04L 29/06* (2006.01)
*G06F 21/30* (2013.01)

(52) U.S. Cl.
CPC .............. *H04L 63/10* (2013.01); *G06F 21/305* (2013.01); *H04L 63/162* (2013.01)

(58) Field of Classification Search
USPC ................................................ 709/225, 229
See application file for complete search history.

(56) References Cited

U.S. PATENT DOCUMENTS

| 5,778,174 | A  | * | 7/1998  | Cain ............................ 726/11 |
| 2002/0147816 | A1 | * | 10/2002 | Hlasny ......................... 709/227 |
| 2004/0267716 | A1 | * | 12/2004 | Prabu et al. ..................... 707/3 |
| 2005/0249200 | A1 | * | 11/2005 | Oelsner ........................ 370/356 |
| 2006/0294402 | A1 | * | 12/2006 | Poisner ........................ 713/300 |
| 2007/0067428 | A1 | * | 3/2007  | Ogawa et al. ................. 709/223 |
| 2007/0268919 | A1 | * | 11/2007 | Sarikaya et al. .............. 370/401 |
| 2008/0235502 | A1 | * | 9/2008  | Lu et al. ........................... 713/1 |

* cited by examiner

*Primary Examiner* — Noel Beharry
(74) *Attorney, Agent, or Firm* — Trop, Pruner & Hu, P.C.

(57) ABSTRACT

In network access control networks, it may be difficult to provide certain remote accesses such as remote boot or remote storage access. An available network connection established through chipset firmware (e.g. active management technology (AMT)) may be utilized to establish a connection and to enable the remote access. Then as soon the completion of the activity is detected, such as remote booting, then the connection may be immediately terminated to prevent access by improper agents.

18 Claims, 3 Drawing Sheets

ENABLING ACCESS TO REMOTE ENTITIES IN ACCESS CONTROLLED NETWORKS

BACKGROUND

This relates generally to the fields of data processing and data communication. Various embodiments relate to access controlled networks.

The proliferation of computer viruses and/or worm attacks in combination with the tendency for many of these malware mechanisms (e.g., worms, viruses, Trojan horses, rootkits) to propagate into corporate networks reinforces the movement for industry-wide development of network security measures to ensure that unauthorized and incompliant devices are not allowed access to various network assets. One manifestation of these efforts can be seen in the various proprietary and/or standards-based solutions for operating systems to measure various pertinent attributes of a host device. To eliminate, isolate, and reduce the impact and/or effects of malware, these measured attributes of a host device are now often evaluated, with the assistance of operating systems, before allowing that host device to connect to a protected network.

BRIEF DESCRIPTION OF THE DRAWINGS

The various embodiments will be described by way of exemplary configurations, but not limitations, illustrated in the accompanying drawings in which like references denote similar elements, and in which.

DETAILED DESCRIPTION

Reference in the specification to a "digital device" means that a particular feature, structure, or characteristic, namely device operable programmability or the ability for the device to be configured to perform designated functions, is included in at least one embodiment of the digital device as used herein. Typically, digital devices may include general and/or special purpose computing devices, such as, but not limited to, a laptop computer, a personal digital assistant (PDA), mobile phone, and/or console suitably configured for practicing the present invention in accordance with at least one embodiment. The terms "client device" and "host device" are often synonymously used herein and are interchangeable with digital device as previously defined. Reference in the specification to "remote device" means a network device electronically coupled to the digital device or host platform via a network interface and suitably configured for practicing the present invention in accordance with at least one embodiment. Exemplary network devices may include general and/or special purpose computing devices, such as a network access policy decision point (PDP), a Policy Enforcement Point (PEP), a gateway, a router, a bridge, a switch, a hub, a repeater, and/or a server.

Network access control (NAC) technology provides enterprise platform security from host devices requesting network access. In a typical network access control protocol exchange, a host device or access requester provides data to an enterprise policy server to seek access to a network. The host device typically initiates a network connection (e.g., via IEEE 802.1x EAP-type protocol as defined in the IEEE 802.1X standard, IEEE std. 802.11X-2001, published Jul. 13, 2001) to a Network Access Device (NAD). This initial access request may be redirected to a policy decision point (PDP) in the network, thereby communicating the intent of the host device to connect to the network. Control channel connection requests are ultimately routed to a policy server equipped to make authorization decisions on network access requests, based on an administrative policy. Once a decision is made, a NAD or Policy Enforcement Point (PEP) controls if and how the host device is allowed onto the network.

One issue with deploying 802.1X network access control in large enterprises is that it breaks the existing legacy protocols, such as Preboot Execution Environment (PXE), that are implemented as part of the basic input/output system to remote clients off the networks. See PXE Specification v.2.1., published by Intel Corporation and Systemsoft on Sep. 20, 1999. PXE enables remote booting of devices over a network. Since no legacy basic input/output system supports 802.1X network access control, the clients cannot obtain network access in such environments and, thus, the PXE remote boot does not work.

Figure 1:
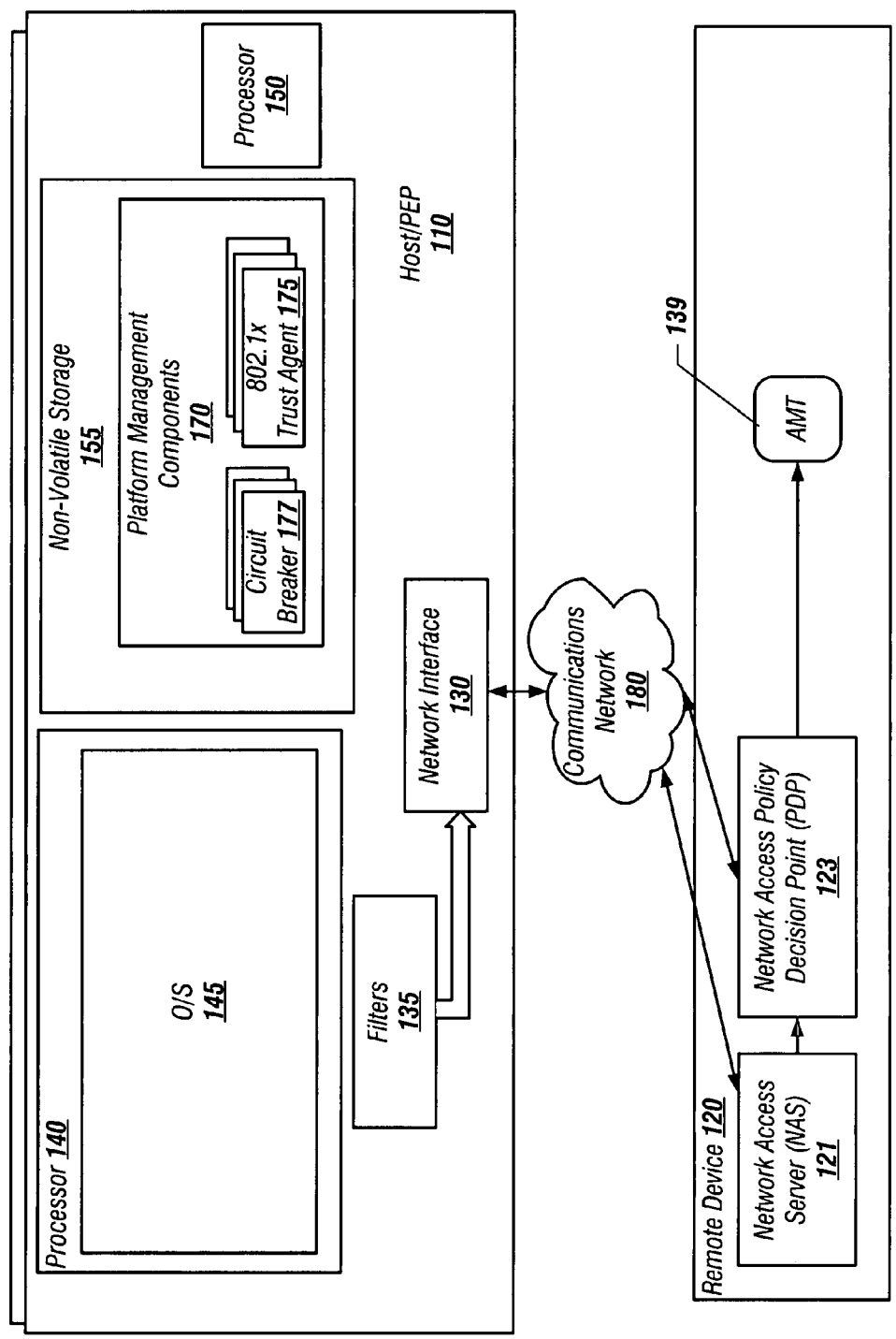
FIG. 1 is a block diagram of an operating system independent secure network access by a host platform coupled with different network components in accordance with at least one embodiment.

Referring to FIG. 1, a high-level block diagram illustrates an overview of one embodiment. In some embodiments, a protocol conveys network access requests from the at least one host platform device 110 and at least one remote device 120. The at least one host platform device 110 subsequently receives network access determinations and/or related policy information which can then be enforced on the at least one host platform device 110. One embodiment uses an instantiation of an Extensible Authentication Protocol type-length-value (EAP-TLV) protocol infrastructure, a publicly accessible IEEE 802.1X EAP-type protocol, to facilitate a secure exchange between the at least one host platform device 110 and the at least one remote device 120. Institute of Electronic and Electrical Engineers (IEEE) Standard 802.1X-2001, ("Port Based Network Access Control"), approved Jun. 14, 2001, referred to herein as the "802.1X standard."

The illustrated host platform device 110 includes a network interface 130, a first processor 140, a second processor 150, an operating system 145, and one or more platform management components 170, operationally coupled to each other as shown. The platform management components 170 are adapted to be executed by the second processor 150, independently of the operating system 145.

The network interface 130, coupled with the first processor 140 and/or the second processor 150, is configured to communicate with the at least one remote device 120 across communications network 180. The communication network 180 may include at least one gateway, router, bridge, switch, hub, repeater, and/or server. Additional or different components may be included in various embodiments of the host platform device 110 which are not illustrated in FIG. 1.

A chipset may include the network interface 130 which may include a wired, wireless network interface card or any other like device for issuing network connectivity requests for access to the network 180. In one embodiment, the platform 110 requests connectivity via an 801.1X control channel.

In various embodiments, the platform management components 170 determine and sign information of the host platform device 110 via firmware agents 175, independently of the operating system 145. In one embodiment, firmware agents 175 exhibit at least two characteristics: 1) code executing within the host operating system 145 does not modify or tamper with firmware agent code, prevent firmware agent code from running, or circumvent operation of the firmware agent 175; and 2) firmware agents 175 have exclusive access to certain host resources, for example filters 135 associated with the network interface 130 and unrestricted access to other resources, such as non-volatile storage 155 and associated controllers. In this manner, embodiments may provide a tamper resistant execution environment on host platform device 110 which may allow the host platform device 110 to act as a PEP acting on behalf of the network administrator to restrict or enable network access of the host platform device 110, based on detected operational conditions. In one embodiment, at least some platform operational conditions may be reported to the remote device 120.

In one embodiment, enforcement of various access control policies may require participation of run time environments, such as an operating system driver, active management technology (AMT) 139, manageability engines (ME) (AMT-ME), and AMT processors (AMT-P), input/output (I/O) devices, or, for example, an input/output controller depending on implementation choices. In one embodiment, an I/O filter rule may be implemented as a state machine for each peripheral device, individually or collectively, for all devices attached to a bus.

In one embodiment, AMT 139 may be utilized as an embedded trust agent that does 802.1X and network admission control extensions so that AMT 139 can establish channels on the network 180. Other embedded trust agents (chipset and firmware) provided on a chipset may also be used to authenticate with a network without using an operating system. Once AMT establishes a network 180 connection, then other protocols may use AMT's connection to boot onto the network 180. One example of such a protocol is the Preboot Execution Environment or PXE which is useful for enabling remote booting of devices over a network.

Once on the network, AMT 139, in the active state, blocks most traffic. Thus, an exception may be made for PXE traffic to allow PXE traffic during the AMT active state. As soon as the remote device boots, the host connection, sponsored by AMT, is terminated to prevent any unauthorized agent from gaining access to the network using the AMT connection or channel. The AMT connection is cut or circuit breakers 177 are implemented as soon as the boot is detected.

Several different techniques may be used to detect that the remote boot is complete. A first technique uses a Host Embedded Controller Interface (HECI) trigger (not shown in FIG. 1) to a manageability engine (ME) (not shown in FIG. 1) to indicate that the PXE boot is complete. The HECI driver is used by AMT 139 to tell AMT when a system has booted. Thus, when AMT detects that PXE has booted, pursuant to an alert from the HECI trigger, AMT may transition from the active to the passive state. In the passive state, AMT does not provide any channels for network access. It also does not block host communications. In the active mode, such as when it has established a connection for PXE boot, AMT blocks network block host connections and host traffic.

As another alternative, EAP traffic may be detected. A medium access control (MAC) filter in the hardware, called a circuit breaker filter 177, can be programmed to send AMT an alert when an EAP packet is detected. If an EAP packet is detected, again, AMT transitions to the passive state. In the passive state, AMT relinquishes the 802.1X channel.

As still another alternative, if a boot is not detected in a certain amount of time, such as, for example, 120 seconds, it can be assumed that the boot is complete and, even if not, as a fail safe, AMT 139 may be transitioned to the passive mode.

As still yet another example, PXE boot detection may be done pursuant to the PXE 2.1 specification. For example, Dynamic Host Configuration Protocol-PXE (DHCP-PXE) extensions or trivial file transfer protocol (TFTP) packets may be detected. A circuit breaker filter 177 alerts if the PXE boot is not detected for 30 seconds and then AMT transitions to the passive state.

Figure 2:
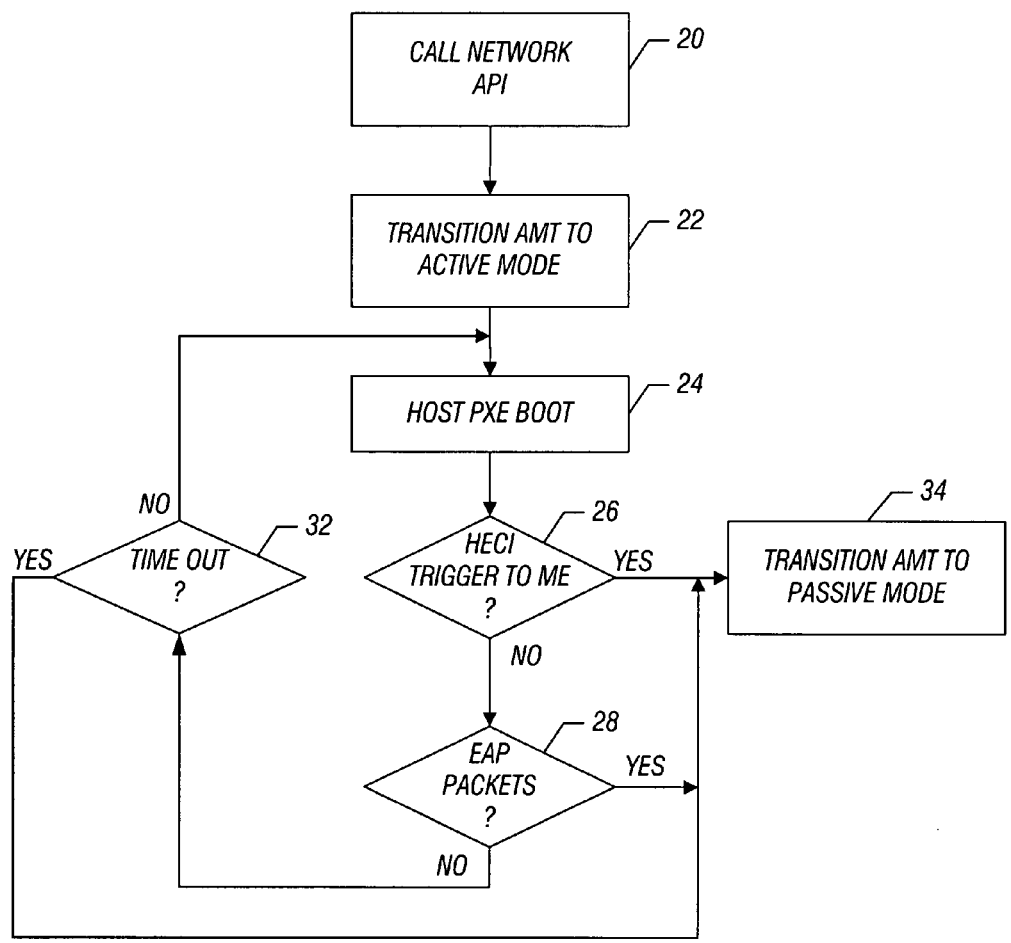
FIG. 2 is a flow chart for one embodiment of the present invention.

Turning now to FIG. 2, methods, in accordance with various embodiments, are described in terms of computer firmware, software, and hardware with reference to a state or flow diagram. In various embodiments, portions of the operations to be performed by a host platform device and/or remote devices may constitute state machines or computer programs made up of computer-executable instructions. These instructions are typically maintained in a storage medium accessible by the host platform device and/or remote devices.

A storage medium includes any mechanism that provides (i.e., stores and/or transmits) information in a form readable by a machine (e.g., a computer). For example, a storage medium includes read only memory (ROM), random access memory (RAM), magnetic disk storage media, optical storage media, flash memory devices, electrical, optical, acoustical or other forms of propagated signals (e.g., carrier waves, infrared signals, digital signals), and the like.

Describing the methods by reference to a flow diagram enables one skilled in the art to develop such programs, including instructions to carry out the methods on suitably configured host platforms and/or remote devices. In various embodiments, at least one of the processors of a suitably configured host platform and/or remote device executes the instructions from the storage medium. In various embodiments, the computer-executable instructions may be written in a computer programming language or may be embodied in firmware logic, reconfigurable logic, a hardware description language, a state machine, an application-specific integrated circuit, or combinations thereof. If written in a programming language conforming to a recognized standard, such instructions may be executed on a variety of hardware platforms and may interface with a variety of operating systems.

The present embodiments are not described with reference to any particular programming language. A variety of programming languages may be used to implement the teachings of the embodiments as described herein. Furthermore, it is common in the art to speak of software in one form or another (e.g., program, procedure, process, application, etc.) as taking an action or causing a result. Such expressions are merely a shorthand way of saying that execution of the software by a network device causes the processor of the computer to perform an action or a produce a result.

Thus, according to FIG. 2, in accordance with one embodiment, initially, a network application program interface (API) may be called, as indicated in block 20. The API implements the use of AMT to establish a connection under 802.1X and enables PXE boot in one embodiment. Then, in block 22, AMT transitions to the active state where it is able to establish such a connection. At block 24, a command is issued for PXE boot of the remote device 20. The first check at diamond 26 determines whether a HECI trigger to a manageability engine has been detected. If so, AMT transitions to the passive mode (block 34). If not, a check at diamond 28 determines whether EAP packets have been detected. If so, again, the AMT transitions to the passive mode (block 34).

If EAP packets were not detected, then a check at diamond 32 determines whether a time out has occurred. If a time out has occurred, then either it is presumed that the boot has occurred or, even if the boot has not occurred, the channel must be cut off and the AMT is transitioned back to the passive mode (block 34). Absent a time out, the flow iterates.

Figure 3:
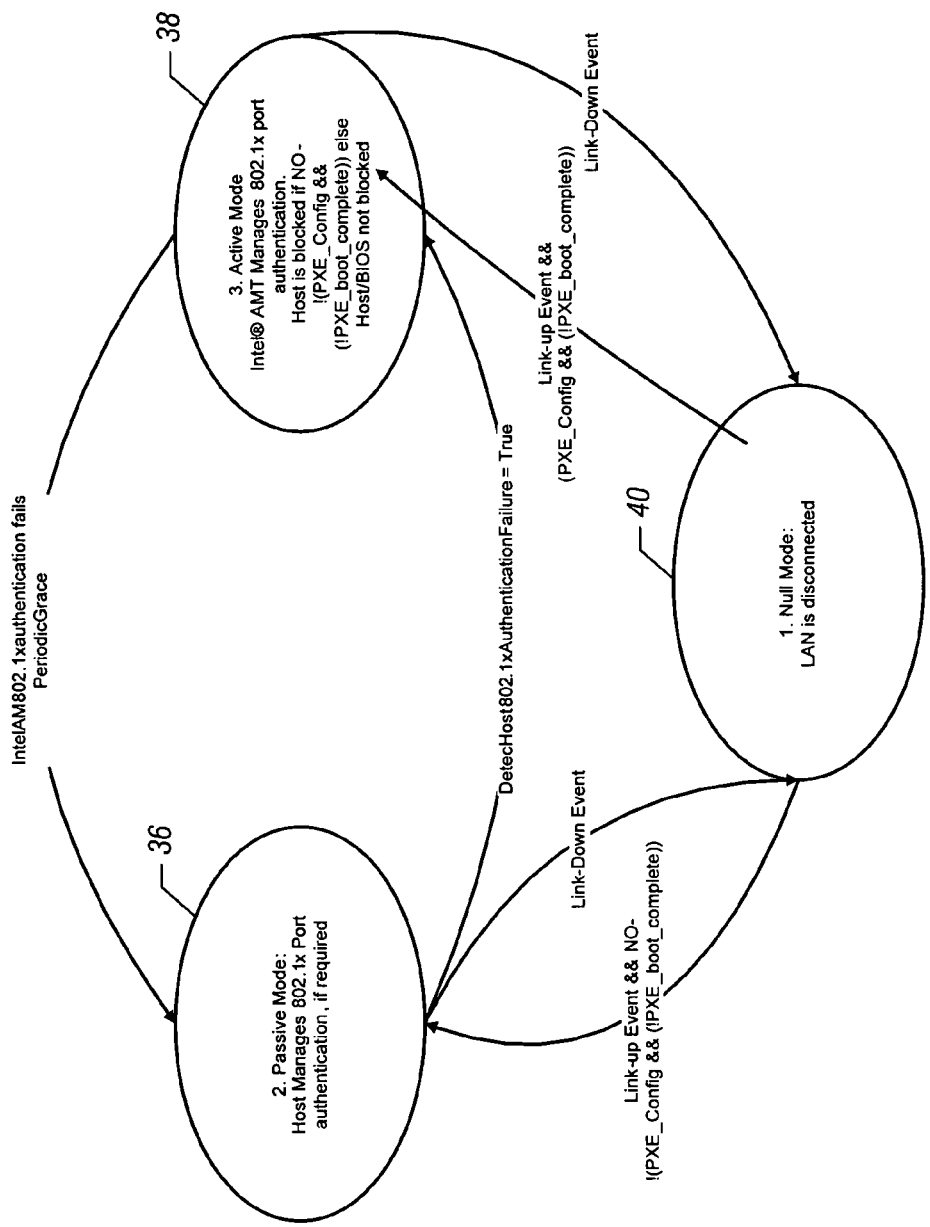
FIG. 3 is a state diagram for one embodiment of the present invention.

Referring to FIG. 3, in accordance with one embodiment, three major AMT states may be used in one embodiment. In the null state 40, the network is disconnected. In the passive mode 36, the host manages the 802.1X port authentication as required. In the active state 38, the AMT manages the 802.1X port authentication. Host traffic is blocked.

AMT is effectively inactive in passive mode 36. AMT does not block any traffic and does not establish network connections.

A transition occurs from active mode 38 to passive mode 36 when authentication fails. Similarly, there is a transition from passive to active mode when a host cannot get on the network and wants to use the AMT connection pursuant to the network API to do so.

In addition, each time there is a boot connect, a link-up event occurs which transitions from null to passive mode. A link-down event transitions back to the null mode. Likewise, a link-up event that boot is not complete transitions to the active mode and a link-down event transitions back to the null mode.

Thus, the embedded network access control trust agent in the AMT firmware can authenticate with the network, providing its credentials to gain network access, even when the host is not up or booted. In other embodiments, embedded firmware, which may be part of a chipset, may do the same thing. Thus, a basic input/output system (BIOS) PXE agent can leverage the AMT network connection (or another similar connections) to gain network access to enable remote boot.

Similarly, the same technology can be used to securely access remote storage facilities, for example, through an Internet Small Computer Systems Interface (ISCSI) connection. See RFC 3720-Internet Small Computer Systems Interface (iSCSI) Network Working Group, April 2004.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computer readable non-transmission storage medium storing instructions that are executed to enable a manageability engine to:
    if a network cannot be accessed by a device because of network access control, establish a network access connection using said manageability engine's access rights to the network;
    allow the device to use the connection to boot on the network;
    detect booting on the network; and
    in response to detecting booting on the network, terminate the manageability engine's connection, while leaving the device booted on the network.

2. The medium of claim 1 further storing instructions to detect the successful completion of the network connection.

3. The medium of claim 2 further storing instructions to detect remote booting of a device over the network.

4. The medium of claim 3 further storing instructions to detect remote booting includes detecting the presence of a host embedded controller interface driver.

5. The medium of claim 3 further storing instructions to detect remote booting includes detecting the presence of an extensible authentication protocol packet.

6. The medium of claim 3 further storing instructions to detect a time out and in response to detecting a time out, terminating the connection.

7. The medium of claim 1 further storing instructions to establish a network access connection by establishing a connection using an embedded trust agent to authenticate without using an operating system.

8. The medium of claim 7 further storing instructions to transition the embedded trust agent in the form of active management technology from the passive to the active state to establish a connection.

9. The medium of claim 8 further storing instructions to transition the active management technology to the passive state when a remote device has been accessed over the network.

10. The medium of claim 1 further storing instructions to detect at least one of a dynamic host configuration protocol or a trivial transfer file protocol packet to determine that a remote device has booted.

11. A system comprising:
    a pair of processors, one of said processors to execute an operating system that acts as a host;
    at least one non-volatile storage storing platform management components, said storage storing instructions to attempt to enable a device to access a network, if the network cannot be accessed because of network access control, establish a network access connection using a manageability engine that has network access rights to the network, allow the device to use the connection to boot on the network and, detect booting on the network and, in response to detecting booting on the network, terminate the manageability engine's connection while leaving the device booted on the network; and
    a network interface coupled to at least one of said processors.

12. The system of claim 11, said host to detect the presence of a host embedded controller interface driver.

13. The system of claim 11, said host to detect the presence of an extensible authentication protocol packet.

14. The system of claim 11, said host to detect a time out in response to connection of a time out, terminate the connection.

15. The system of claim 11, a host including active management technology, said host to establish a network connection by establishing a connection using an embedded trust agent to authenticate without using an operating system.

16. The system of claim 15, wherein said trust agent is active management technology, said host to transition active management technology from passive to active to establish a connection.

17. The system of claim 16, said host to transition active management technology to the passive state when the device has been accessed over the network.

18. The system of claim 11, said host to detect one of a dynamic host configuration protocol or a trivial transfer file protocol packet to determine that the device has booted.

\* \* \* \* \*